US012308194B2

(12) United States Patent
Hetzmannseder et al.

(10) Patent No.: US 12,308,194 B2
(45) Date of Patent: May 20, 2025

(54) ACTIVE/PASSIVE FUSE MODULE

(71) Applicant: Littelfuse, Inc., Chicago, IL (US)

(72) Inventors: Engelbert Hetzmannseder, Chicago, IL (US); Derek Lasini, Schaumburg, IL (US); David Arthur Burns, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 239 days.

(21) Appl. No.: 18/198,016

(22) Filed: May 16, 2023

(65) Prior Publication Data

US 2024/0021394 A1 Jan. 18, 2024

Related U.S. Application Data

(60) Provisional application No. 63/389,154, filed on Jul. 14, 2022.

(51) Int. Cl.
*H01H 39/00* (2006.01)
*H01H 85/08* (2006.01)
(Continued)

(52) U.S. Cl.
CPC .......... *H01H 85/08* (2013.01); *H01H 39/006* (2013.01); *H01H 85/18* (2013.01); *H01H 85/38* (2013.01)

(58) Field of Classification Search
CPC ........... H01H 85/08; H01H 39/00–006; H01H 85/18; H01H 85/38; H01H 2039/008
See application file for complete search history.

(56) References Cited

U.S. PATENT DOCUMENTS 4,224,487 A * 9/1980 Simonsen ............ H01H 39/006 200/61.08
2013/0220095 A1* 8/2013 Ukon .................. H01H 39/006 83/639.1
(Continued)

FOREIGN PATENT DOCUMENTS

DE 202015106793 U1 1/2016
DE 102015112141 A1 1/2017
(Continued)

OTHER PUBLICATIONS

European Search Report for EP Application No. 23178159.2, dated Nov. 27, 2023, 11 pages.

*Primary Examiner* — Jacob R Crum
(74) *Attorney, Agent, or Firm* — KDW Firm PLLC

(57) ABSTRACT

An active/passive fuse module including a fuse having an electrically insulating fuse body, first and second endcaps disposed on opposing ends of the fuse body, a fusible element extending through the fuse body between the first endcap and the second endcap, and an arc quenching material disposed within the fuse body and surrounding the fusible element. The fuse module further includes a pyrotechnic interrupter (PI) coupled to the fuse body, the PI having a housing defining a shaft, a piston disposed within the shaft, a drive pin extending from the piston into the fuse body, the drive pin terminating in a cutter disposed adjacent the fusible element, and a pyrotechnic ignitor disposed within the shaft above the piston configured to detonate upon receiving an initiation signal from a controller, whereby the piston and the drive pin are forcibly driven through the shaft causing the cutter to separate the fusible element.

19 Claims, 6 Drawing Sheets

(51) Int. Cl.
*H01H 85/18* (2006.01)
*H01H 85/38* (2006.01)

(56) References Cited

U.S. PATENT DOCUMENTS

| | | | | |
|---|---|---|---|---|
| 2014/0061011 | A1* | 3/2014 | Nakamura | H01H 39/006 200/61.08 |
| 2016/0336131 | A1 | 11/2016 | Fellmer et al. | |
| 2016/0351363 | A1* | 12/2016 | Gaudinat | B60L 3/04 |
| 2017/0076890 | A1* | 3/2017 | Hori | B60L 3/0007 |
| 2019/0371561 | A1 | 12/2019 | Ehrhardt | |
| 2020/0066465 | A1* | 2/2020 | Moszynski | H01H 9/32 |
| 2020/0203102 | A1* | 6/2020 | Sakai | H01H 39/006 |
| 2020/0279711 | A1* | 9/2020 | Mathieu | H01H 85/0039 |

FOREIGN PATENT DOCUMENTS

| | | | |
|---|---|---|---|
| EP | 3736846 | A1 | 11/2020 |
| EP | 3840006 | A1 | 6/2021 |
| JP | 2008091292 | A | 4/2008 |
| JP | 5817685 | B2 | 11/2015 |
| JP | 6210647 | B2 | 10/2017 |
| JP | 2019515476 | A | 6/2019 |
| JP | 2020506515 | A | 2/2020 |
| JP | 2020161468 | A | 10/2020 |
| JP | 2020184541 | A | 11/2020 |
| JP | 6873857 | B2 | 5/2021 |
| JP | 2021097038 | A | 6/2021 |
| WO | 2014048913 | A1 | 4/2014 |
| WO | 2022121373 | A1 | 6/2022 |

* cited by examiner

ACTIVE/PASSIVE FUSE MODULE

CROSS-REFERENCES TO RELATED APPLICATIONS

This application claims the benefit of U.S. Provisional Patent Application No. 63/389,154, filed Jul. 14, 2022, which is incorporated by reference herein in its entirety.

FIELD OF THE DISCLOSURE

This disclosure relates generally to the field of circuit protection devices and relates more particularly to an active/passive fuse module that includes both passive and active circuit protection elements.

BACKGROUND OF THE DISCLOSURE

Fuses are commonly implemented in electrical systems for providing overcurrent protection. Most fuses are "passive" devices that include fuse elements that are configured to carry a rated amount of electrical current during normal operation. If current flowing through a fuse element exceeds the fuse element's rated current, the fuse element will melt, disintegrate, or otherwise separate, thereby arresting the current to prevent or mitigate damage to connected electrical components.

In some cases, such as in automobile applications, it may be desirable to "actively" create a physical opening in an electrical circuit regardless of an amount of electrical current flowing through the circuit. For example, if an automobile is involved in a collision, it may be desirable to physically open an electrical circuit in the automobile to ensure that connected electrical components are deenergized to mitigate the risk of fire and/or electrocution in the aftermath of the collision. To that end, so-called pyrotechnic interrupters (PIs) have been developed which can be selectively actuated upon the occurrence of specified events to interrupt the flow of current in a circuit. For example, in the case of an automobile collision, a controller (e.g., an airbag control unit, battery management system, etc.) may send an initiation signal to a PI, causing a pyrotechnic ignitor within the PI to be detonated. A resultant increase in pressure within the PI rapidly forces a piston or blade through a conductor (e.g., a bus bar) that extends through the PI. Electrical current flowing through the PI is thereby interrupted, and the piston, which is formed of a dielectric material, provides an electrically insulating barrier between separated portions of the conductor to prevent electrical arcing therebetween.

In certain applications it may be desirable to implement both passive and active circuit protection elements. It may further be desirable to implement such elements in a compact, space-saving form factor that facilitates convenient installation.

It is with respect to these and other considerations that the present improvements may be useful

SUMMARY

This Summary is provided to introduce a selection of concepts in a simplified form further described below in the Detailed Description. This Summary is not intended to identify key features or essential features of the claimed subject matter, nor is the summary intended as an aid in determining the scope of the claimed subject matter.

An active/passive fuse module in accordance with a non-limiting embodiment of the present disclosure may include a fuse having an electrically insulating fuse body, first and second endcaps disposed on opposing ends of the fuse body, a fusible element extending through the fuse body between the first endcap and the second endcap, and an arc quenching material disposed within the fuse body and surrounding the fusible element. The fuse module may further include a pyrotechnic interrupter (PI) coupled to the fuse body, the PI having a housing defining a shaft, a piston disposed within the shaft, a drive pin extending from the piston into the fuse body, the drive pin terminating in a cutter disposed adjacent the fusible element, and a pyrotechnic ignitor disposed within the shaft above the piston configured to detonate upon receiving an initiation signal from a controller, whereby the piston and the drive pin are forcibly driven through the shaft causing the cutter to separate the fusible element.

Another active/passive fuse module in accordance with a non-limiting embodiment of the present disclosure may include a fuse having an electrically insulating fuse body, first and second endcaps disposed on opposing ends of the fuse body, and a plurality of fusible elements extending through the fuse body between the first endcap and the second endcap. The fuse module may further include a pyrotechnic interrupter (PI) coupled to the fuse body, the PI having a housing defining a shaft, a piston disposed within the shaft, a drive pin extending from the piston into the fuse body, the drive pin terminating in a cutter, wherein at least one of the plurality of fusible elements extends through a respective through hole in the cutter and wherein a bottom edge of the cutter is disposed above at least another one of the plurality of fusible elements, and a pyrotechnic ignitor disposed within the shaft above the piston configured to detonate upon receiving an initiation signal from a controller, whereby the piston and the drive pin are forcibly driven through the shaft causing the cutter to separate the plurality of fusible elements.

DETAILED DESCRIPTION

An active/passive fuse module in accordance with the present disclosure will now be described more fully with reference to the accompanying drawings, in which preferred embodiments of the active/passive fuse module are presented. It will be understood, however, that the active/passive fuse module may be embodied in many different forms and should not be construed as being limited to the embodiments set forth herein. Rather, these embodiments are provided so that this disclosure will convey certain exemplary aspects of the active/passive fuse module to those skilled in the art.

Figure 1A:
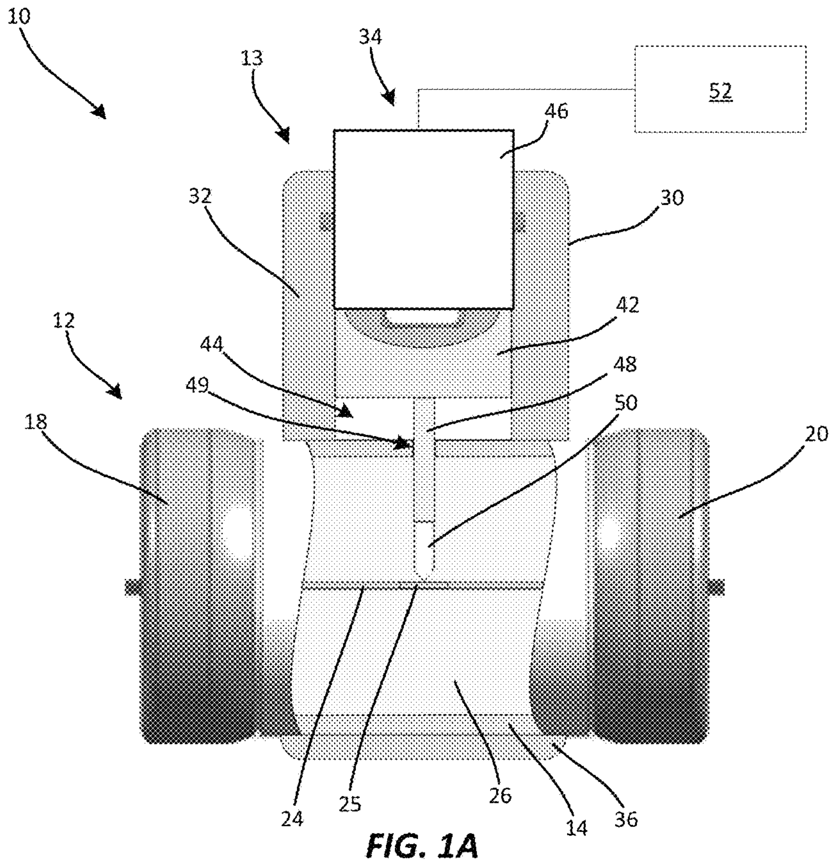
FIG. 1A is a cutaway side view illustrating an embodiment of an active/passive fuse module in accordance with the present disclosure in a non-actuated state.
Figure 1B:
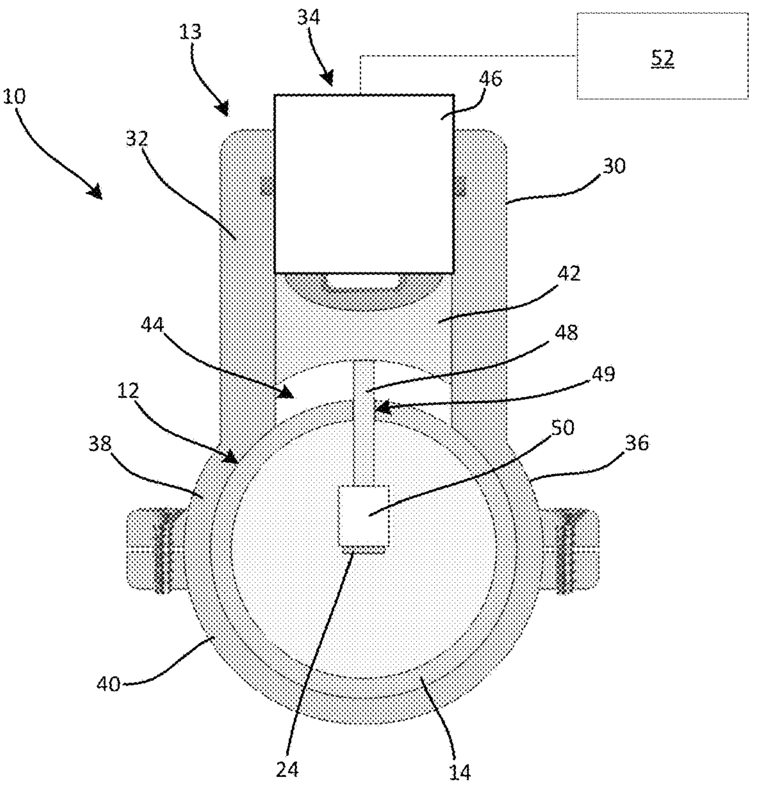
FIG. 1B is a cross sectional end-on view illustrating the active/passive fuse module shown in FIG. 1A.

Referring to FIGS. 1A and 1B, a cutaway side view and a cross sectional end-on view illustrating an active/passive fuse module 10 (hereinafter "the fuse module 10") in accordance with an exemplary, non-limiting embodiment of the present disclosure are shown, respectively. For the sake of convenience and clarity, terms such as "front," "rear," "top," "bottom," "up," "down," "vertical," "horizontal," "lateral," and "longitudinal" may be used herein to describe the relative placement and orientation of various components of the fuse module 10, each with respect to the geometry and orientation of the fuse module 10 as it appears in FIGS. 1A and 1B. Said terminology will include the words specifically mentioned, derivatives thereof, and words of similar import.

The fuse module 10 may generally include a fuse 12 and a pyrotechnic interrupter (PI) 13 coupled to one another as further described below. In various embodiments, the fuse 12 may be a cartridge fuse having a tubular fuse body 14. The present disclosure is not limited in this regard. In various alternative embodiments, the fuse 12 may be a surface mount fuse or other type of fuse having a fusible element extending through a generally hollow fuse body. The fuse body 14 may be formed of an electrically insulating and preferably heat resistant material. Examples of such materials include, but are not limited to, ceramic and glass.

First and second endcaps 18, 20 may be disposed on opposing ends of the fuse body 14. A fusible element 24 may extend through the hollow interior of the fuse body 14 between the first and second endcaps 18, 20. In various embodiments, the endcaps 18, 20 may be formed of an electrically conductive material (e.g., copper, tin, various alloys, etc.), and the fusible element 24 may be connected to the endcaps 18, 20, such as by solder. The first and second endcaps may thus facilitate electrical connection of the fuse module 10 within a circuit. Alternatively, the first and second endcaps 18 may be formed of a dielectric material (e.g., plastic), and the fusible element 24 may extend through, and protrude from, the first and second endcaps 18, 20 (as shown in FIG. 1A), with the protruding ends of the fusible element 24 facilitating electrical connection of the fuse module 10 within a circuit. The fusible element 24 may be formed of an electrically conductive material, including, but not limited to, tin or copper, and may be configured to melt and separate upon the occurrence of a predetermined fault condition, such as an overcurrent condition in which an amount of current exceeding a predefined maximum value flows through the fusible element 24. This maximum value is commonly referred to as the "current rating" of the fuse 12. In various embodiments, the fuse element 24 may be configured to facilitate a current rating in a range between 30 amps and 1000 amps. The present disclosure is not limited in this regard.

The fusible element 24 may be any type of fusible element suitable for a desired application, including, but not limited to, a wire, a strip, a wire wound about an insulating core, etc. In various embodiments, a central portion of the fusible element 24, hereinafter referred to as "the bridge portion 25," may be thinned, narrowed, perforated, or otherwise weakened relative to other portions of the fusible element 24 to ensure that the fusible element 24 separates at the bridge portion 25 when the fuse rating is exceeded. The present disclosure is not limited in this regard.

The interior of the fuse body 14 may be partially or entirely filled with an arc-quenching material or "fuse filler" 26 that may surround the fusible element 24. The arc-quenching material 26 may be provided for mitigating electrical arcing across separated portions of the fusible elements 24 after the fusible element 24 separates (e.g., upon the occurrence of an overcurrent condition in the fuse 12) and may thereby further enhance the breaking capacity of the fuse 12. The arc-quenching material 26 may additionally provide the fusible element 24 with mechanical support as further described below. Arc-quenching materials that be used in the fuse 12 include, but are not limited to, sand, silica, etc.

The PI 13 may include a housing 30 formed of an electrically insulating material, such as plastic, polymer, ceramic, etc. The housing 30 may have a top portion 32 that houses an interrupter assembly 34 and a bottom portion 36 that is clamped onto the fuse body 14 of the fuse 12. For example, as best shown in FIG. 1B, the bottom portion 36 of the housing 30 may include a generally semicircular upper half 38 and a generally semicircular lower half 40 that may be fastened to one another, such as by mechanical fasteners (e.g., screws) extending through flanges that extend from the upper half 38 and the lower half 40 of the bottom portion 36 as shown. The present disclosure is not limited in this regard. Fastened thusly, the bottom portion 36, which may have an interior diameter that is nearly equal to, but slightly larger than, an exterior diameter of the fuse body 14, may be clamped onto, and may surround, the fuse body 14 in a radially close clearance relationship therewith.

The interrupter assembly 34 may include a movable piston 42 disposed within a vertically extending, hollow shaft 44 located above the fuse body 14. The interrupter assembly 34 may further include a pyrotechnic ignitor 46 disposed within the shaft 44 above the piston 42, and a drive pin 48 extending from a bottom of the piston 42. The drive pin 48 may extend into the fuse body 14 via a through hole 49 and may terminate in a cutter 50 located directly above the fusible element 24. The drive pin 48 may be formed or steel or other similarly rigid, durable material. In various embodiments, the cutter 50 may be formed of ceramic or other similarly rigid, durable, dielectric material with low arc tracking. Alternatively, the cutter 50 may be formed of an electrically conductive material, such as metal. The present disclosure is not limited in this regard. The tip of the cutter 50 may be pointed as shown in FIG. 1A but this is not critical. In various embodiments, the tip of the cutter 50 may be attached or secured to the fusible element 24 (e.g., via adhesive, press fit, detent, etc.) to secure the position of the cutter 50 relative to the fusible element 24. The present disclosure is not limited in this regard. A lower edge of the piston 42 may be concave and may have a radius of curvature substantially equal to that of the exterior of the fuse body 14 as shown in FIG. 1B, but this is also not critical.

Figure 2:
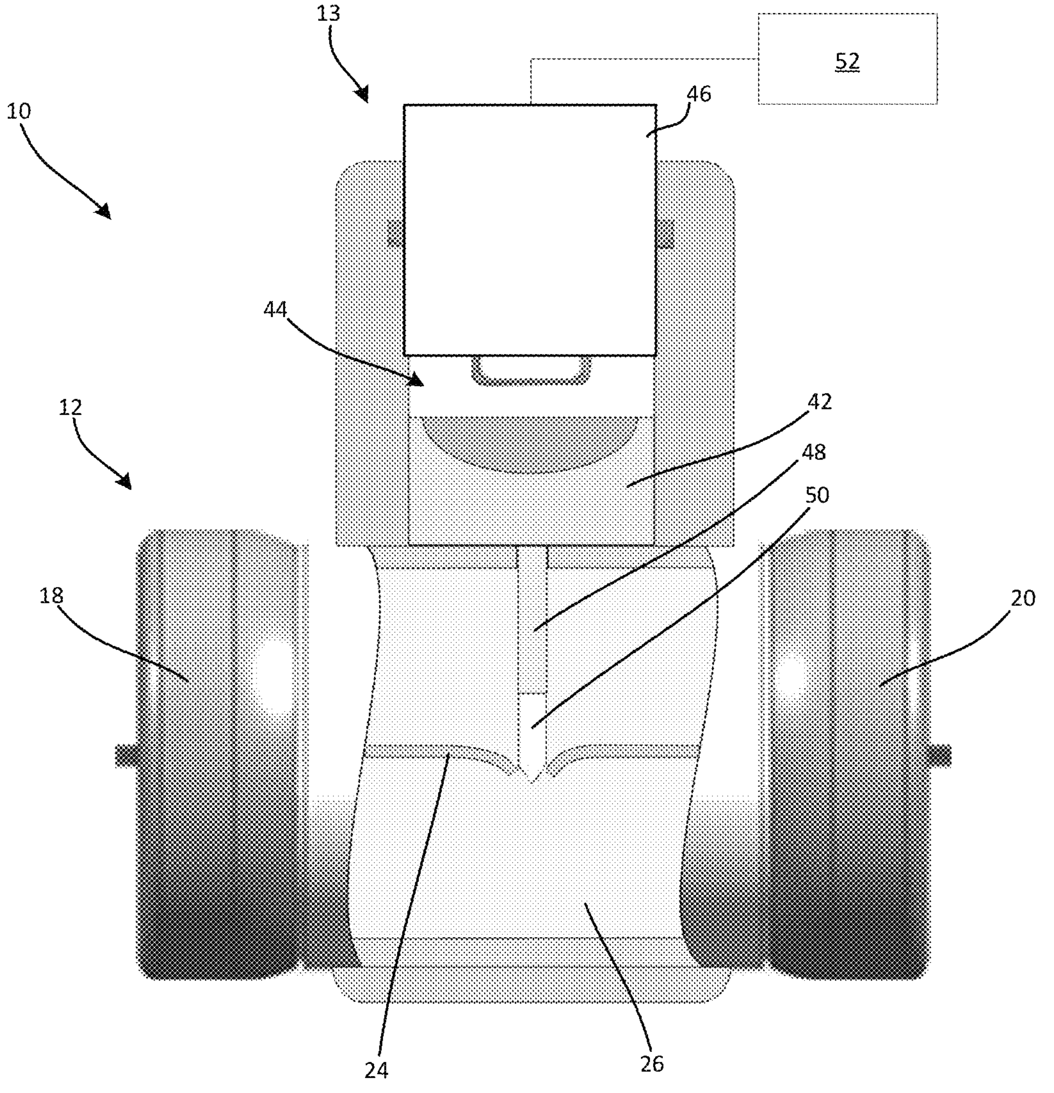
FIG. 2 is a cutaway side view illustrating the active/passive fuse module shown in FIGS. 1A and 1B in an actuated state.

The pyrotechnic ignitor 46 may be coupled to a controller 52 (e.g., an airbag control unit, battery management system, etc. of an automobile). Upon the occurrence of a predefined event, such as an automobile collision (i.e., if the fuse module 10 is implemented in an automobile), the controller 52 may send an initiation signal to the pyrotechnic ignitor 46, causing the pyrotechnic ignitor 46 to be detonated. A resultant increase in pressure within the shaft 44 above the piston 42 rapidly forces the piston 42 and the drive pin 48 downwardly through the shaft 44, causing the cutter 50 to sever the fusible element 24 as shown in FIG. 2. Electrical current flowing through the fusible element 24 is thereby interrupted. If the cutter is formed of a dielectric material, the cutter 50 may provide an electrically insulating barrier between the separated portions of the fusible element 24 to prevent electrical arcing therebetween. Moreover, severance of the fusible element 24 by the cutter 50 may lengthen an arc that has already been initiated but not yet self-extinguished, thereby increasing the arc voltage and facilitating faster interruption. Alternatively, if the cutter 50 is formed of an electrically conductive material, the cutter 50 may act to split an arc that has already been initiated, thereby increasing the overall arc voltage and contributing to faster interruption of the arc.

Advantageously, the arc-quenching material 26 (e.g., sand) surrounding the fusible element 24 may provide the fusible element 24 with mechanical support and may hold the fusible element 24 securely in place when it is engaged by the cutter 50. This may facilitate a clean and complete cut through the fusible element 24, whereas if the fusible element 24 were merely surrounded by air the fusible element 24 would be prone to being pushed aside, partially cut, or merely bent by the cutter 50. This obviates the need for special structural features extending from the fuse body 14 for supporting the fusible element 24 as sometimes found in traditional pyrofuse modules.

In view of the above description, it will be appreciated that the fuse module of the present disclosure facilitates both "active" triggering (i.e., via the controller 52 sending an initiation signal to the pyrotechnic ignitor 46 upon the occurrence of a collision, etc.) as well as "passive" triggering (i.e., via the fusible element 24 melting/separating when subjected to currents exceeding the current rating of the fuse 12). This provides numerous advantages. For example, owing to the arc-quenching material 26 surrounding the fusible element 24, the fuse module 10 can passively interrupt very high currents (e.g., greater than 20 kA) without being destroyed or causing an electric arc of unacceptable duration. Additionally, the PI 13 can be actuated to interrupt the circuit at any time, regardless of the amount of current flowing through the fuse module 10. For example, even if the current in the fuse module 10 is zero, the pyrotechnic ignitor 46 can be actuated to disconnect an automobile battery from an automobile's electrical system if, for example, the vehicle experiences a collision while parked. Additionally, when operating at medium to high currents where the fuse 12 may passively clear a circuit too slowly, the pyrotechnic ignitor 46 can be actuated to clear the circuit much faster. Still further, even after the fusible element 24 is melted/separated upon the occurrence of an overcurrent condition (i.e., after passive triggering of the fuse module 10), the pyrotechnic ignitor 46 can be actuated to improve/ensure complete separation and galvanic isolation in the fusible element 24, thereby increasing open state resistance and reducing or eliminating leakage current.

Figure 3A:
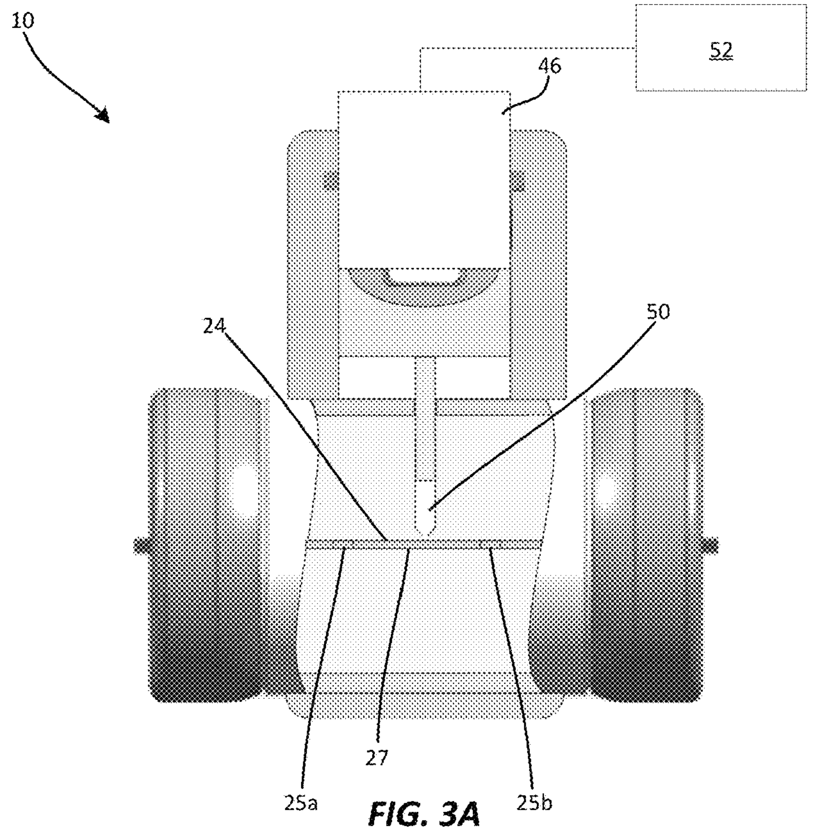
FIG. 3A is a cutaway side view illustrating another embodiment of an active/passive fuse module in accordance with the present disclosure.
Figure 3B:
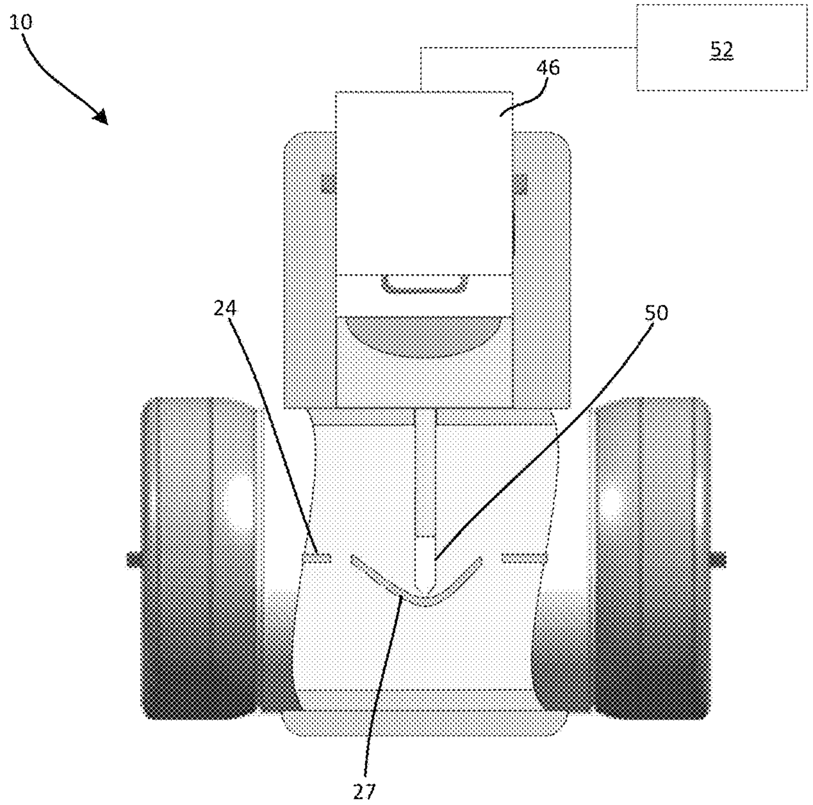
FIG. 3B is a cutaway side view illustrating the active/passive fuse module shown in FIG. 3A in an actuated state.

While the fuse module 10 has been shown and described above as having a cutter 50 that is configured to cut directly through a bridge portion 25 of the fusible element 24, alternative embodiments of the fuse module 10 are contemplated in which the cutter 50 is adapted to indirectly separate the fusible element 24 at multiple bridge portions. For example, referring to FIG. 3A, the fusible element 24 may include first and second bridge portions 25*a*, 25*b* separated by an intermediate portion 27 spanning therebetween. The first and second bridge portions 25*a*, 25*b* may be narrower, thinner, or otherwise mechanically weaker than the intermediate portion 27. The intermediate portion may be aligned with (e.g., located directly below) the cutter 50, and the first and second bridge portions 25*a*, 25*b* may be offset from (e.g., located on either side of) the cutter 50. When the pyrotechnic ignitor 46 is detonated as shown in FIG. 3B, the cutter 50 may be driven into the intermediate portion 27, causing the intermediate portion 27 to be forced downwardly, such force causing the fusible element 24 to be ripped, broken, or otherwise separated at the mechanically weaker bridge portions 25*a*, 25*b*. That is, the intermediate portion 27, which is directly engaged by the cutter 50, remains unbroken (though may be deformed as shown) while the bridge portions 25*a*, 25*b* are ripped, broken, or otherwise separated. Electrical current flowing through the fusible element 24 is thereby interrupted as described above. In the embodiment of FIGS. 3A and 3B, it may be desirable for the tip of the cutter 50 to be rounded, squared, or otherwise blunt since it is not necessary or desirable for the cutter 50 to cut or separate the intermediate portion 27.

Figure 4A:
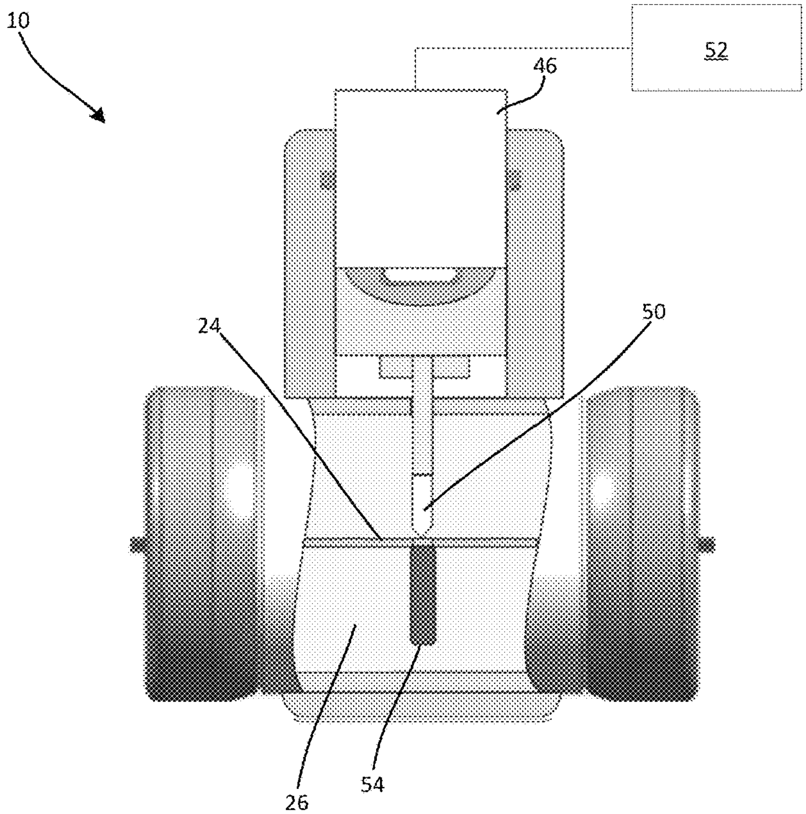
FIG. 4A is a cutaway side view illustrating another embodiment of an active/passive fuse module in accordance with the present disclosure.
Figure 4B:
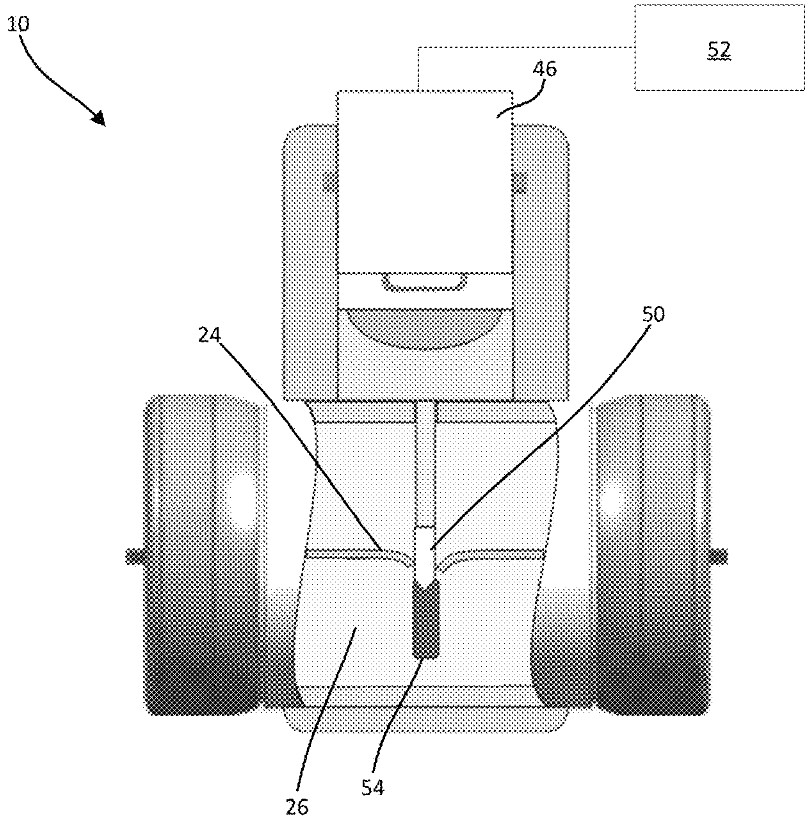
FIG. 4B is a cutaway side view illustrating the active/passive fuse module shown in FIG. 4A in an actuated state.

Referring to FIGS. 4A, yet another embodiment of the above-described fuse module 10 is shown. The embodiment of FIG. 4A may be substantially identical to the embodiment of FIGS. 1A and 1B but may further include a crush rib 54. The crush rib 54 may be a column or pillar formed of a relatively low-density material (e.g., silicone foam or similar material) that is aligned with the cutter 50 and that extends from a bottom of the fusible element 24 to, or nearly to, an interior surface of the fuse body 14. The purpose of the crush rib 54 is to partially or entirely fill the space directly underneath the cutter 50 and the fusible element 24 to block the arc-quenching material 26 from packing into this space. The crush rib 54 thus provides a medium having a lower mechanical resistance than the arc-quenching material through which the cutter 50 can pass when the pyrotechnic ignitor 46 is detonated as shown in FIG. 4B, thus ensuring that the cutter 50 can cleanly and rapidly separate the fusible element 24 without significant obstruction.

Figure 5A:
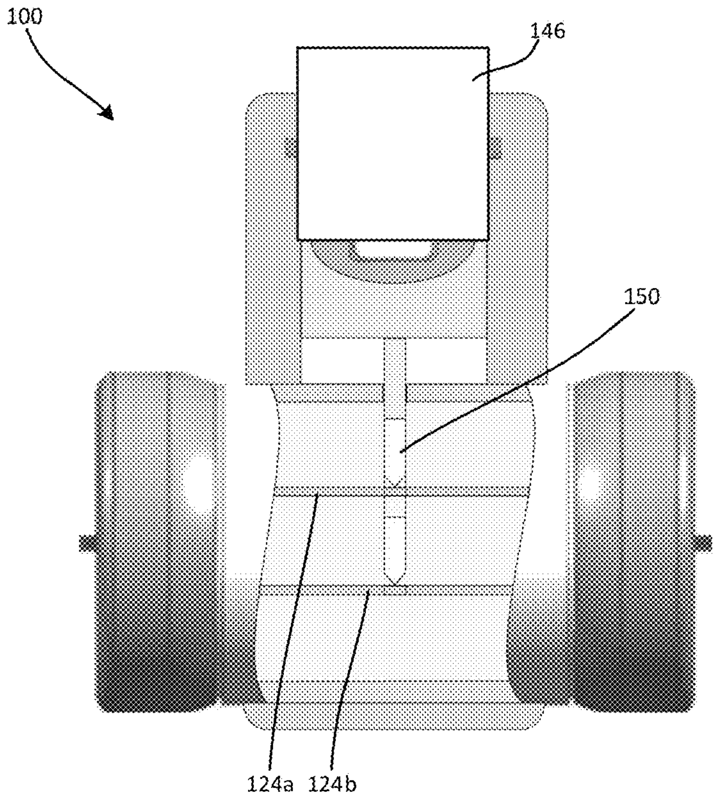
FIG. 5A is a cutaway side view illustrating another embodiment of an active/passive fuse module in accordance with the present disclosure.
Figure 5B:
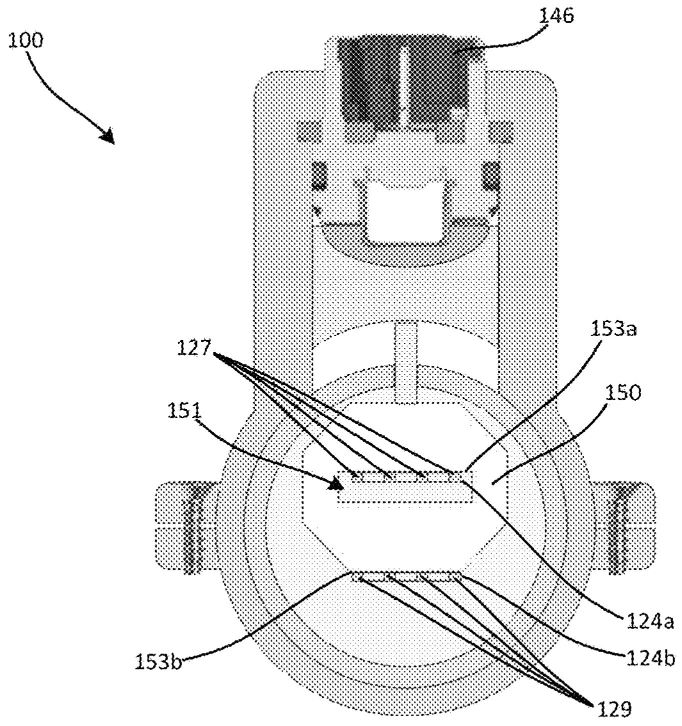
FIG. 5B is a cross sectional end-on view illustrating the active/passive fuse module shown in FIG. 5A.

Referring to FIGS. 5A and 5B, a cutaway side view and a cross sectional end-on view illustrating another active/passive fuse module 100 (hereinafter "the fuse module 100") in accordance with an exemplary, non-limiting embodiment of the present disclosure are shown, respectively. The fuse module 100 may be substantially similar to the fuse module 10 described above but may include a plurality of vertically spaced fusible elements 124*a*, 124*b*. Two fusible elements 124*a*, 124*b* (hereinafter "the first fusible element 124*a*" and "the second fusible element 124*b*") are depicted, but a greater number of fusible elements can be implemented without departing from the scope of the present disclosure. A greater number of fusible elements may provide the fuse module 100 with greater current handling capability. Moreover, while the fusible elements 124*a*, 124*b* are shown as being oriented parallel to one another, this is not critical. As shown in FIG. 5B, each of the first and second fusible elements 124*a*, 124*b* may include a plurality of bridge legs 127, 129 separated by gaps. The bridge legs 127, 129 may be relatively thinner than other portions of the first and second fusible elements 124*a*, 124*b* and may thus be adapted to melt and separate upon the occurrence of an overcurrent condition in the fuse module 100. Each of the first and second fusible elements 124*a*, 124*b* is depicted as having four bridge legs 127, 129, but this is not intended to be limiting. Fusible elements having a greater or fewer number of bridge legs can be implemented without departing from the present disclosure.

The fuse module 100 may include a multilevel cutter 150 having a through hole 151 formed therein. The first fusible element 124*a* may extend through the through hole 151. A top edge of the through hole 151 may define a first blade 153*a* disposed above the first fusible element 124*a*, and the bottom edge of the cutter 150 may define a second blade 153*b* disposed above the second fusible element 124*b*. Thus, when the pyrotechnic ignitor 146 is actuated, the cutter 150 may simultaneously cut and separate the first fusible element 124*a* and the second fusible element 124*b*. While not shown in FIGS. 5A and 5B, it will be appreciated that the fuse module 100 may additionally include a crush rib (similar to the crush rib 54 described above) disposed below the second fusible element 124*b* and aligned with the cutter 150. The present disclosure is not limited in this regard.

Figure 6:
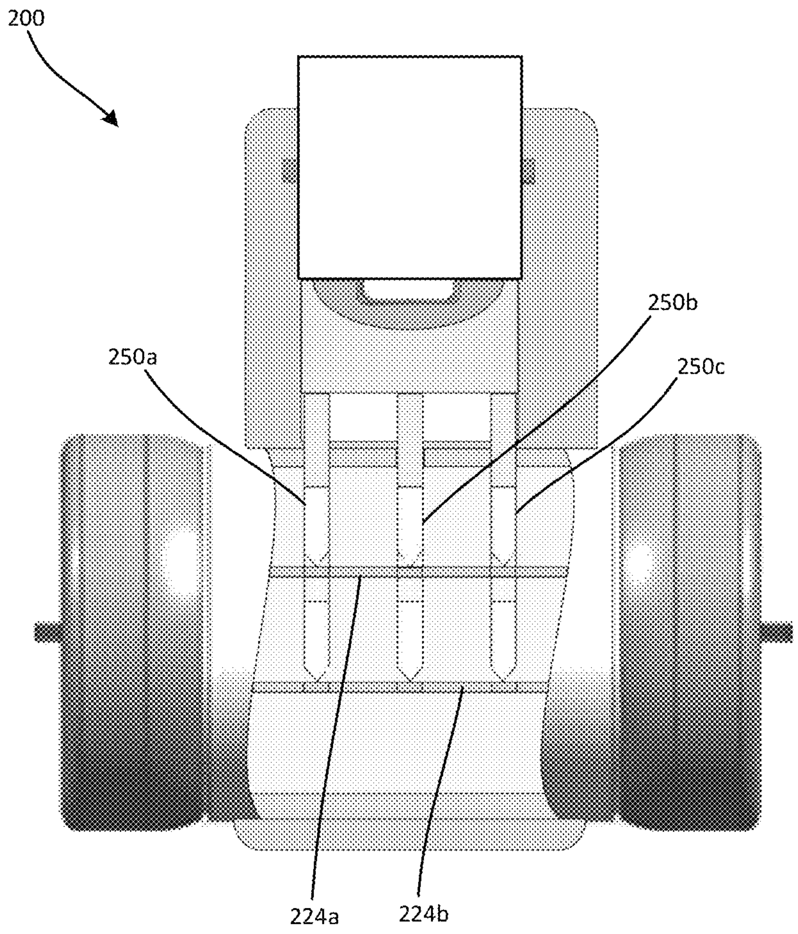
FIG. 6 is a cutaway side view illustrating another embodiment of an active/passive fuse module in accordance with the present disclosure.

Referring to FIG. 6, a cutaway side view illustrating another active/passive fuse module 200 (hereinafter "the fuse module 200") in accordance with an exemplary, non-limiting embodiment of the present disclosure is shown. The fuse module 200 may be substantially similar to the fuse module 100 described above but may include a plurality of parallel, horizontally spaced cutters 250*a*, 250*b*, 250*c*. The cutters 250*a*, 250*b*, 250*c* may be substantially identical to the cutter 150 described above and may be adapted to simultaneously cut the fusible elements 224*a*, 224*b* at numerous locations along their lengths. Three cutters 250*a*, 250*b*, 250*c* are depicted, but a greater or fewer number of parallel cutters can be implemented without departing from the scope of the present disclosure. A greater number of cutters may provide the fuse module 200 with a higher breaking capacity.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An active/passive fuse module comprising:
a fuse comprising:
an electrically insulating fuse body;
first and second endcaps disposed on opposing ends of the fuse body;
a fusible element extending through the fuse body between the first endcap and the second endcap; and
an arc quenching material disposed within the fuse body and surrounding the fusible element;
a pyrotechnic interrupter (PI) coupled to the fuse body, the PI comprising:
a housing defining a shaft;
a piston disposed within the shaft;
a drive pin extending from the piston into the fuse body, the drive pin terminating in a cutter disposed adjacent the fusible element; and
a pyrotechnic ignitor disposed within the shaft above the piston configured to detonate upon receiving an initiation signal from a controller, whereby the piston and the drive pin are forcibly driven through the shaft causing the cutter to separate the fusible element; and
a crush rib disposed below the fusible element and aligned with the cutter, wherein the crush rib at least partially fills a space directly underneath the cutter and the fusible element to block the arc-quenching material from packing into the space, and wherein the crush rib provides a medium having a lower mechanical resistance than the arc-quenching material through which the cutter can pass when the PI is detonated.

2. The active/passive fuse module of claim 1, wherein the fusible element has a bridge portion that is mechanically weaker than surrounding portions of the fusible element, and wherein the cutter is aligned with the bridge portion and is configured to pass directly through the bridge portion upon detonation of the PI.

3. The active/passive fuse module of claim 2, wherein a tip of the cutter is pointed.

4. The active/passive fuse module of claim 1, wherein the fusible element includes an intermediate portion spanning between a first bridge portion and a second bridge portion, wherein the first bridge portion and the second bridge portion are mechanically weaker than the intermediate portion, and wherein the cutter is aligned with the intermediate portion and is configured to directly engage the intermediate portion upon detonation of the PI and to cause the fusible element to separate at the first bridge portion and the second bridge portion.

5. The active/passive fuse module of claim 4, wherein a tip of the cutter is blunt.

6. The active/passive fuse module of claim 1, wherein the cutter is formed of a dielectric material.

7. The active/passive fuse module of claim 1, wherein the cutter is formed of an electrically conductive material.

8. The active/passive fuse module of claim 1, wherein the housing of the PI is clamped onto the fuse body of the fuse.

9. The active/passive fuse module of claim 1, wherein a tip of the cutter is fastened to the fusible element to secure a position of the cutter relative to the fusible element.

10. The active/passive fuse module of claim 1, wherein the crush rib is formed of silicone foam.

11. An active/passive fuse module comprising:
a fuse comprising:
an electrically insulating fuse body;
first and second endcaps disposed on opposing ends of the fuse body;
a plurality of fusible elements extending through the fuse body between the first endcap and the second endcap; and
a pyrotechnic interrupter (PI) coupled to the fuse body, the PI comprising:
a housing defining a shaft;
a piston disposed within the shaft;
a drive pin extending from the piston into the fuse body, the drive pin terminating in a cutter, wherein at least one of the plurality of fusible elements extends through a respective through hole in the cutter and wherein a bottom edge of the cutter is disposed above at least another one of the plurality of fusible elements; and
a pyrotechnic ignitor disposed within the shaft above the piston configured to detonate upon receiving an initiation signal from a controller, whereby the piston and the drive pin are forcibly driven through the shaft causing the cutter to separate the plurality of fusible elements.

12. The active/passive fuse module of claim 11, wherein each of the plurality of fusible elements has a plurality of bridge legs that are parallel to one another and that are mechanically weaker than surrounding portions of the plurality of fusible elements, and wherein the cutter is aligned with the bridge legs and is configured to pass directly through the bridge legs upon detonation of the PI.

13. The active/passive fuse module of claim 11, wherein the cutter is formed of a dielectric material.

14. The active/passive fuse module of claim 11, wherein the cutter is formed of an electrically conductive material.

15. The active/passive fuse module of claim 11, wherein the cutter is fastened to at least one of the plurality of fusible elements to secure a position of the cutter relative to the plurality of fusible elements.

16. The active/passive fuse module of claim 11, further comprising an arc quenching material disposed within the fuse body and surrounding the plurality of fusible elements.

17. The active/passive fuse module of claim 16, further comprising a crush rib disposed below the plurality of fusible elements and aligned with the cutter, wherein the crush rib at least partially fills a space directly underneath the cutter and the plurality of fusible elements to block the arc-quenching material from packing into the space, and wherein the crush rib provides a medium having a lower mechanical resistance than the arc-quenching material through which the cutter can pass when the PI is detonated.

18. The active/passive fuse module of claim 17, wherein the crush rib is formed of silicone foam.

19. The active/passive fuse module of claim 11, wherein the cutter comprises a plurality of cutters spaced apart from one another along lengths of the plurality of fusible elements, wherein the plurality of cutters are configured to separate the plurality of fusible elements at various points along the lengths of the plurality of fusible elements when the PI is detonated.

* * * * *